United States Patent Office 3,109,725
Patented Nov. 5, 1963

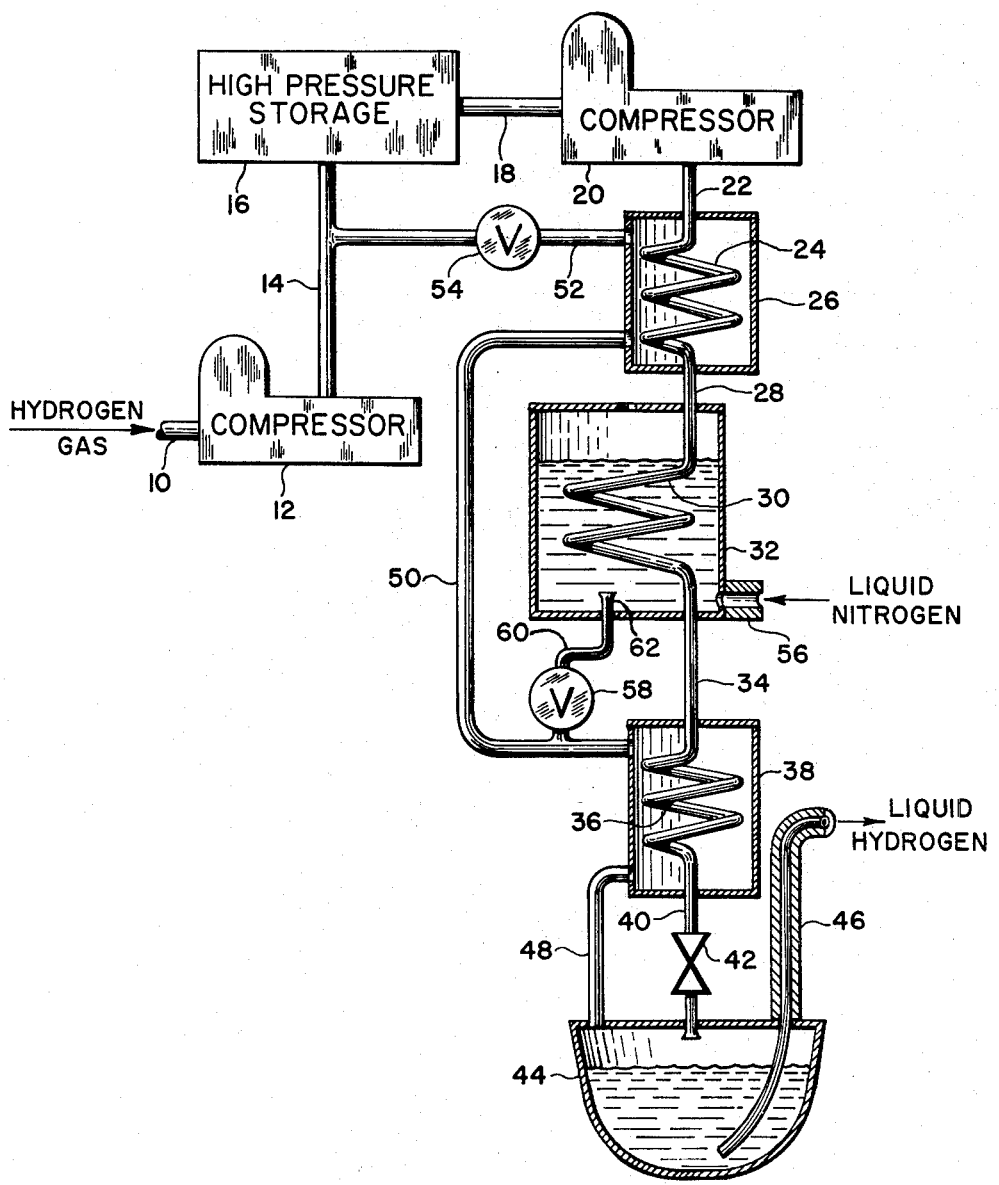

3,109,725
HYDROGEN LIQUEFACTION
Thomas M. Flynn, Davenport, Iowa, assignor to The Bendix Corporation, Davenport, Iowa, a corporation of Delaware
Filed Nov. 1, 1961, Ser. No. 149,284
2 Claims. (Cl. 62—9)

This invention relates to improvements in the production of liquid hyrogen. It relates to improvements in the means of conducting, and the method of conducting the hydrogen liquefaction process known as the Joule-Thomson expansion method including precooling of the hydrogen gas by a liquid coolant.

In the past conduct of this process, the combination of economic factors and the character of available coolant materials dictated that the coolant be liquid nitrogen precooled by maintenance at pressures much below atmospheric pressure. Accordingly, commercial hydrogen liquefaction apparatus has heretofore included vacuum pumps, which were large in relation to the yield of liquid hydrogen, and all of the expense and construction problems incident to vacuum ssytems.

Among the objects of the invention is the elimination of the need for these vacuum pumps and these problems to achieve comparable yields of liquid hydrogen or to permit the use of a lesser vacuum system while achieving greater yields.

Another object is to permit the use of other liquid coolants with greater economy than it has been in the past.

These and other objects and advantages of the invention which will be apparent hereinafter and in the accompanying drawing are realized by provision of a novel approach to subcooling the liquid coolant which makes use of hydrogen, which of course is available in the system, in a way that permits subcooling of the coolant at pressures near atmospheric pressure.

A body of liquid will be cooled if it contains a material having a lower boiling point and if the body of liquid is made to boil. The degree in which this effect is exhibited depends upon the degree of difference in the boiling points of the two materials at a common pressure. The invention is based in part on the discovery that the practically usable coolants, particularly liquid nitrogen, will combine mechanically with a sufficient quantity of gaseous hydrogen at pressures at and near atmospheric pressure to accomplish lowering the boiling point of the nitrogen, which will continue to boil, in a degree comparable to that achieved in vacuum systems.

The single figure of the drawing is a diagram of apparatus for converting hydrogen gas to liquid hydrogen which, in the form shown, is one embodiment of the invention. It is to be understood that various modifications may be made in this embodiment and other modifications are possible without departing from the spirit of the invention and the scope of the appended claims.

In the case of hydrogen, the inversion temperature for the Joule-Thomson effect is approximately 204 degrees Kelvin; therefore isenthalpic expansion will not produce cooling unless the hydrogen is first precooled below this temperature. Actually it must be cooled to far below this temperature to achieve reasonable yields, to cool the hydrogen gas with liquid air or, and especially, liquid nitrogen in a heat exchanger, and to reduce the temperature of the liquid nitrogen, or air, by reducing its pressure. The expense and the complication of the system and apparatus incident to use of vacuum are avoided by this invention. As previously explained, the temperature of the liquid coolant is reduced if there is added to it a substance having a lower boiling point and this is true even when the substance added is not liquefied but remains in the dissolved state. While other gases, helium and the others having lower boiling points than the coolant, may be used, it is advantageous to use hydrogen because it is readily available in the system. When hydrogen is bubbled ito liquid nitrogen at atmospheric pressure the nitrogen will be cooled to as low as 63 to 65 degrees Kelvin, depending on the concentration of the dissolved hydrogen, which is substantially the temperature of the nitrogen coolant in practical vacuum systems.

In this process the hydrogen is dispersed through the liquid coolant and remains in the gaseous state. The boiling point of the mixture is lowered to a value intermediate the boiling point of the two substances, and heat is lost through increased boiling whereby the temperature of the mixture is reduced.

Referring to the drawing, hydrogen gas entering at inlet 10 is compressed in a compressor 12 and delivered by line 14 to high pressure storage container 16 from whence it passes by line 18 to compressor 20 and is further compressed advantageously to between 100 and 120 times atmospheric pressure. Leaving the compressor 20 by line 22 the gas passes through the coils 24 of a first heat exchanger 26 and then by line 28 to the coils 30 of a second heat exchanger 32 containing the coolant liquid nitrogen. The hydrogen gas leaves the second heat exchanger 32 by a line 34 and enters the coils 36 of a third heat exchanger 38. The hydrogen gas then leaves these coils by a line 40 at a temperature well below its inversion temperature and enters the expansion valve 42 from whence it expands into the vessel 44.

In the expansion, a portion of the hydrogen becomes liquid to be withdrawn from the vessel 44 through the insulated line 46. The hydrogen that remains in the gaseous state is very cold and is used as the coolant in the first and third heat exchangers. It leaves the vessel 44 and enters the third exchanger 38 by a line 48 and it leaves the third and enters the first heat exchanger 26 by a line 50. On leaving the first exchanger it passes through line 52, a valve 54 and line 14 back to the high pressure storage container 16.

Liquid coolant, advantageously liquid nitrogen, is introduced into the second heat exchanger 32 by an insulated inlet line 56 where it is cooled below its normal temperature at atmospheric pressure by being mixed with a fluid having a lower boiling point. Advantageously this fluid is gaseous hydrogen which is bubbled into the body of coolant. Further advantage is gained if this gaseous hydrogen is cold and is taken from the flow of gas from vessel 44 back to the storage container 16. In the embodiment selected for illustration, some of the gas is withdrawn from line 50. It passes through a reducing valve 58 and a line 60 to an outlet 62 in the body of liquid coolant in heat exchanger 32.

In the system selected for illustration and with hydrogen leaving compressor 20 at about 100 times atmospheric pressure, the temperature of the hydrogen at various points will be approximately as follows: leaving the first heat exchanger—about 85 degrees Kelvin, leaving the second heat exchanger—about 64 degrees Kelvin, leaving the third heat exchanger and entering the expansion valve—about 43 degrees Kelvin, leaving the vessel 44 in the direction of the third exchanger—about 21 degrees Kelvin. These are approximately the same temperatures that are attained at corresponding points in prior systems in which the nitrogen in the second exchanger is subjected to greatly reduced pressure. Accordingly, the invention makes it possible to produce the same yield of liquid hydrogen without the need to reduce the pressure in the nitrogen coolant exchanger or, if the nitrogen is maintained at reduced pressure it will permit a somewhat higher yield of liquid nitrogen.

I claim:
1. The improvement in conducting the Joule-Thomson hydrogen liquefaction process with precooling of the hydrogen gas by a boiling liquid nitrogen coolant which comprises lowering the boiling point of the liquid nitrogen by mechanically mixing a gas from the group consisting of hydrogen and helium gas with the boiling nitrogen coolant.

2. The improvement in conducting the Joule-Thomson hydrogen liquefaction process with precooling of the hydrogen gas by a boiling liquid nitrogen coolant which comprises lowering the boiling point of the liquid nitrogen by mechanically mixing with the boiling nitrogen coolant cold hydrogen gas that has been expanded in said process without being liquified.

References Cited in the file of this patent

UNITED STATES PATENTS

| | | |
|---|---|---|
| 53,682 | Rose | Apr. 3, 1866 |
| 101,682 | Tuttle | Apr. 5, 1870 |
| 310,025 | Brewer | Dec. 30, 1884 |
| 2,297,786 | Lindblom | Oct. 6, 1942 |
| 2,550,886 | Thompson | May 1, 1951 |
| 2,932,173 | Mordhorst | Apr. 12, 1960 |
| 2,937,506 | Stirlen | May 24, 1960 |

OTHER REFERENCES

Rubemann, M.: The Separation of Gases, London, Oxford University Press, 1949, pp. 45–63, QC 286 R8–1949.